United States Patent
Krayden et al.

(10) Patent No.: US 11,212,137 B2
(45) Date of Patent: Dec. 28, 2021

(54) VIRTUAL PROVIDER EDGE CLUSTER FOR USE IN AN SDN ARCHITECTURE

(71) Applicants: DRIVENETS LTD., Raanana (IL); AT&T SERVICES, INC., Dallas, TX (US)

(72) Inventors: Amir Krayden, Even Yehuda (IL); Yuval Moshe, Tirat Carmel (IL); Anton Gartsbein, Kiryat Tivon (IL); Gal Zolkover, Haifa (IL)

(73) Assignees: DRIVENETS LTD., Raanana (IL); AT&T SERVICES, INC., Dallas, TX (US)

( * ) Notice: Subject to any disclaimer, the term of this patent is extended or adjusted under 35 U.S.C. 154(b) by 85 days.

(21) Appl. No.: 16/607,996

(22) PCT Filed: Apr. 22, 2018

(86) PCT No.: PCT/IL2018/050447
§ 371 (c)(1),
(2) Date: Oct. 24, 2019

(87) PCT Pub. No.: WO2018/198114
PCT Pub. Date: Nov. 1, 2018

(65) Prior Publication Data
US 2020/0067729 A1 Feb. 27, 2020

Related U.S. Application Data

(60) Provisional application No. 62/489,596, filed on Apr. 25, 2017.

(51) Int. Cl.
*H04L 12/46* (2006.01)
*H04L 12/723* (2013.01)
*H04L 12/713* (2013.01)

(52) U.S. Cl.
CPC ...... *H04L 12/4625* (2013.01); *H04L 12/4633* (2013.01); *H04L 12/4641* (2013.01); *H04L 45/50* (2013.01); *H04L 45/586* (2013.01)

(58) Field of Classification Search
CPC ............ H04L 12/4625; H04L 12/4633; H04L 12/4641; H04L 45/50; H04L 45/586
See application file for complete search history.

(56) References Cited

U.S. PATENT DOCUMENTS

2003/0074443 A1* 4/2003 Melaku ................... H04L 47/15
709/224
2014/0365634 A1* 12/2014 Metz ....................... H04L 41/14
709/224

(Continued)

*Primary Examiner* — Mohammad S Anwar
(74) *Attorney, Agent, or Firm* — Browdy and Neimark, PLLC (57) ABSTRACT

A sub-system is described which is operative to be used as a virtual Provider Edge (v PE) cluster of an SDN communication system. The sub-system comprises a plurality of network elements, wherein the v PE cluster further comprises one or more virtual routing engines for routing traffic to/from the plurality of network elements, the one or more virtual routing engines are configured to communicate with a managing entity and with a plurality of virtual forwarding engines, and wherein the managing entity is configured to manage operation of the one or more virtual routing engines and the plurality of virtual forwarding engines. According to another aspect, the sub-system comprises a plurality of network elements and a managing entity, wherein the network elements having each one or more ports to convey traffic therethrough, and wherein at least one of the ports associated with the sub-system is configured to serve a plurality of customers.

19 Claims, 8 Drawing Sheets

(56) References Cited

U.S. PATENT DOCUMENTS

2016/0277290 A1* 9/2016 Sivabalan ............... H04L 45/50
2017/0026245 A1* 1/2017 Rao ......................... H04L 45/02
2018/0165107 A1* 6/2018 Elzur .................. G06F 9/45558

* cited by examiner

VIRTUAL PROVIDER EDGE CLUSTER FOR USE IN AN SDN ARCHITECTURE

TECHNICAL FIELD

The present disclosure generally relates to the field of communication systems. More particularly, the present disclosure relates to systems implementing Software-defined networking.

Glossary

AAA—Authentication, Authorization and Accounting
ARP—Address Resolution Protocol
BGP—Border Gateway Protocol
CBB—Core Backbone
CC—Centralized Controller
CE—Customer Equipment
CLI—Command Line Interface
CRS—Carrier Routing System
eBGP—Exterior BGP
FE—Forwarding Engine
FIB—Forwarding Information Base
FPM—Forwarding Path Manager
GRE—Generic Routing Encapsulation
iBGP—interior BGP
LACP—Link Aggregation Control Protocol
LAN—Local Area Network
lo—Loopback
MC-LAG—Multi Chassis Link Aggregation Group
NB—Northbound.
OSPF—Open Shortest Path First
PE—Provider Edge
RE—Routing Engine
RIB—Routing information Base
SNMP—Simple Network Management Protocol
μBFD—Micro Bidirectional Forwarding Detection
UI—User interface
VLAN—Virtual LAN
VM—Virtual Machine
vPE—Virtual Provider Edge
VPN—Virtual Private Network
VTEP—VXLAN Tunnel Endpoint
VXLAN—Virtual Extensible LAN Data Path Service—a service provided by all Forwarding Engines (FEs) which are responsible to forward all the packets arriving at the data path plane towards the CEs, PEs and Core routers, and implement the data path features e.g. QoS, ACL, packets' classification, and the like.

Docker Container—a docker container provides a complete files' system that contains everything that a software comprised in that docker container needs to run: code, runtime, system tools, system libraries, in fact anything that one may install on a server. This guarantees that the software comprised in the docker container will always run the same, regardless of the environment it is running in.

Management Service—a service provided by a managing entity (Manager) which is responsible for the system configuration and monitoring its performance, where its Northbound (NB) elements are used for providing control and administration functionality.

Routing Service—a service provided by a Routing Engine (RE) which is responsible for using the appropriate routing protocol from among all routing protocols supported by the system, when communicating with specific CEs, PEs and Core routers, and optionally controlling and synchronizing certain data path related features such as distributed QoS.

White Box—a commodity, being an open or industry-standard compliant hardware for switches and/or routers within the forwarding plane. White boxes provide users with the foundational hardware elements of a network.

BACKGROUND

Software-defined networking (hereinafter "SDN") is a concept whereby one is able to dynamically initialize, control, change, and manage network behavior through programming of open interfaces and abstraction of lower-level functionality. SDN is meant to address the fact that the static architecture of traditional networks does not support a dynamic, scalable computing and storage needs of modern computing environments such as data centers. This is done by decoupling or disassociating the system that makes decisions on where traffic is being sent (the SDN controller, or the control plane) from the underlying systems that forward traffic to the selected destination (the data plane).

The SDN architecture is a dynamic, manageable, cost-effective, and adaptable architecture, that aims to be suitable for the high-bandwidth, dynamic nature of today's applications. Typical SDN architectures decouple network control and forwarding functions, enabling network control to become directly programmable and the underlying infrastructure to be abstracted from applications and network services.

The vast, ever-increasing number of mobile devices and content, server virtualization, and advent of cloud services are among the trends driving the networking industry to re-examine traditional network architectures. Many conventional networks are hierarchical, built with tiers of Ethernet switches arranged in a tree-like structure. This design made sense when client-server computing was dominant, but such a static architecture is not to the dynamic computing and storage needs of today's enterprise data centers, and carrier environments. Among the key computing trends driving the need for a new network concept, are:

a) Changing Traffic Patterns

Within the enterprise data center, traffic patterns have changed significantly. Unlike client-server applications, where the major part of the communication occurs between one client and one server, today's applications access different databases and servers. At the same time, users are changing network traffic patterns as they push for access to corporate content and applications from any type of device (including their own), connecting from anywhere, at any time. Also, many enterprise data centers managers are contemplating a utility computing model, which might include a private cloud, a public cloud, or some combination thereof, resulting in additional traffic being forwarded across the wide area network.

b) Increasing IT Load

Users are increasingly employing mobile personal devices such as smartphones, tablets, and notebooks to access corporate networks. As a result, the IT is under pressure to accommodate these personal devices in a fine-grained manner while still providing adequate protection to corporate data.

c) Growth of Cloud Services

Enterprises have embraced both public and private cloud services, resulting in unprecedented growth of these services. Enterprise business units now require to have agility to access applications, infrastructure, and other IT resources on demand. To add to the complexity, planning for cloud services must be done in an environment of increased security along with business reorganizations, consolidations, and mergers that can change assumptions overnight. Providing self-service provisioning, whether in a private or in a public cloud, requires elastic scaling of computing, storage, and network resources, ideally from a common viewpoint and with a common suite of tools.

d) Higher Bandwidth Requirements

Handling today's "big data" or mega datasets requires massive parallel processing on thousands of servers, all of which need direct connections to each other. The rise of mega datasets is a source for a constant demand for additional network capacity in the data center. Operators of hyperscale data center networks face the task of scaling the network to previously unimaginable size while maintaining any-to-any connectivity, all with affordable Capex.

The following list relates to various elements comprising such a network architecture:

SDN Application

SDN Applications are programs that communicate their network requirements and desired network behavior directly to the SDN Controller via a northbound interface ("NBI"). In addition, they may consume an abstracted view of the network for their internal decision-making purposes. An SDN Application typically consists of one SDN Application Logic and one or more NBI Drivers. SDN Applications may themselves expose another layer of abstracted network control, thus offering one or more higher-level NBIs through respective NBI agents.

SDN Controller

The SDN Controller is a logically centralized entity in charge of (i) translating the requirements from the SDN Application layer down to the SDN Datapaths and (ii) providing the SDN Applications with an abstract view of the network (e.g. statistics and events). An SDN Controller consists of one or more NBI Agents, the SDN Control Logic, and the Control to Data-Plane Interface ("CDPI") driver.

SDN Datapath

The SDN Datapath is a logical network device that exposes visibility and control over its advertised forwarding and data processing capabilities. The logical representation may encompass all or a subset of the physical substrate resources. An SDN Datapath comprises a CDPI agent and a set of one or more traffic forwarding engines and optionally one or more traffic processing functions. These engines and functions may include simple forwarding between the datapath's external interfaces or internal traffic processing or termination functions. One or more SDN Datapaths may be contained in a single (physical) network element—an integrated physical combination of communications resources, managed as a single unit. An SDN Datapath may also be defined across multiple physical network elements.

SDN Control to Data-Plane Interface (CDPI)

The SDN CDPI is the interface defined between an SDN Controller and an SDN Datapath, which provides (i) programmatic control of all forwarding operations, (ii) capabilities advertisement, (iii) statistics reporting, and (iv) event notification.

SDN Northbound Interfaces (NBI)

SDN NBIs are interfaces placed between SDN Applications and SDN Controllers. They typically provide abstract network views and enable direct expression of network behavior and requirements.

SDN Control Plane

Initial SDN control plane proposals focused on a centralized solution, where a single control entity has a global view of the network. While this simplifies the implementation of the control logic, it has scalability limitations as the size and dynamics of the network increase. To overcome these limitations, several approaches have been proposed in the art that fall into two categories, hierarchical and fully distributed approaches. In hierarchical solutions, distributed controllers operate on a partitioned network view, while decisions that require network-wide knowledge are taken by a logically centralized root controller. In distributed approaches, controllers operate on their local view or they may exchange synchronization messages enabling them to enhance their knowledge. Distributed solutions are more suitable for supporting adaptive SDN applications. A key issue when designing a distributed SDN control plane is to decide on the number and placement of control entities. One important factor that should be taken into account while taking such decisions is the delay associated with the propagation of communication between the controllers and the network devices, especially in large networks. Other factors involve control path reliability, fault tolerance, and application requirements.

OpenFlow is a protocol that is used for forwarding flows in a network implementing SDN architecture. This protocol provides access to the forwarding plane of a network switch (or a router) over the network. The OpenFlow protocol uses Ternary Content Addressable Memory ("TCAM") tables to route traffic flows (packet sequences). If flows arrive at a switch, a flow table lookup is performed. Depending on the flow table implementation this is done in a software flow table. In a case when no matching flow is found, a request would be forwarded to the controller in anticipation for further instructions. This may be handled in one of three different modes. In a reactive mode, the controller responds to these requests by generating and installing a rule in the flow table for the corresponding packet if necessary. In a proactive mode, the controller populates flow table entries for all possible traffic matches possible for this switch in advance. This mode can be compared with typical routing table entries of today, where all static entries are installed ahead of time. By following such a mode, no request would be sent to the controller since all incoming flows will find a matching entry. A major advantage in proactive mode is that all packets are forwarded in line rate (considering all flow table entries in TCAM) and no delay is added. The third mode, hybrid mode, follows the flexibility of a reactive mode for a set of traffic and the low-latency forwarding (proactive mode) for the rest of the traffic.

SUMMARY

The disclosure may be summarized by referring to the appended claims.

It is an object of the present disclosure to provide a system and a method for implementing a centralized controller architecture that enables simplifying Virtual Provider Edge software design while increasing its reliability and the system's operability.

It is another object of the disclosure to provide a solution whereby a single manager may be implemented for controlling all members belonging to the Virtual Provider Edge (hereinafter: "vPE") cluster, thereby enabling implementation of an improved management service.

It is another object of the present disclosure to provide a solution that is capable of dramatically reducing expenses associated with both the price of the required equipment and the operating costs, by using commodity hardware and implementing a software based centralized control rather than using expensive ASIC based routers.

It is another object of the disclosure to provide a solution whereby network services/capacity agility is increased by using a software-based solution rather than solution that is based on physical hardware.

It is another object of the disclosure to provide a solution whereby a single routing management entity is used for updating routing information all over the cluster plane.

It is another object of the disclosure to provide a system comprising a plurality of essentially identical forwarding engines to enable provisioning of a data path service.

It is another object of the disclosure to provide a solution whereby a system is provided with external management capabilities to control white boxes comprised in that system.

It is still another object of the disclosure to provide a solution whereby a system has a high availability configuration which in turn enables the system to effectively address different cases where redundancy is required.

It is another object of the disclosure to provide a solution whereby a system has Multi Chassis Link Aggregation Group ("MC-LAG") capabilities, which in turn enable node level redundancy, port control and the provisioning of increased bandwidth.

It is another object of the disclosure to provide a method and a system adapted to enable slicing and combining traffic flows in accordance with pre-defined criteria (e.g. per customers' SLA, security level, service type etc.), thereby enabling to improve both the user experience as well as the network agility.

It is yet another object of the disclosure to provide a solution that enables managing traffic in one MetroCloud rather than using three individual networks (Mobility, Broadband and Enterprise) for forwarding the same traffic.

It is another object of the disclosure to provide a solution that enables the use of White Boxes under centralized control, thereby providing them with L3/Services capabilities.

Other objects of the present disclosure will become apparent from the following description.

According to a first embodiment of the present disclosure, there is provided a sub-system operative to be used as a virtual Provider Edge (vPE) cluster of an SDN communication system and comprising a plurality of network elements, wherein the vPE cluster further comprises one or more virtual routing engines for routing traffic to/from that plurality of network elements, wherein the one or more virtual routing engines are configured to communicate with a managing entity (e.g. a processor or any other applicable decision making device) and with a plurality of virtual forwarding engines, and wherein the managing entity is configured to manage operation of the one or more virtual routing engines and the plurality of virtual forwarding engines.

According to another embodiment, the vPE cluster is connected to a core network via a leaf-spine configuration, or any other applicable configuration wherein a fabric is used to connect the vPE cluster servers to a respective core network.

In accordance with another embodiment, the leaf and the spine configuration is an arrangement comprising a plurality of white boxes. Optionally, the plurality of white boxes comprises a plurality of commodity hardware (e.g. L2 switches, L1 fabric, or any other commodity silicon-based networking device) operating under a control of the managing entity acting as a centralized controller.

According to still another embodiment, the network elements having each one or more ports to enable conveying traffic therethrough, and wherein at least one of the ports associated with said sub-system is configured to serve a plurality of customers.

By yet another embodiment, the vPE cluster comprises one or more routng engine (RE), each having a forwarding path manager (FPM) distribution functionality and is operative to provide forwarding engines (FEs) associated with the vPE cluster, with all routing information required for them to handle all traffic that needs to be forwarded therefrom.

According to a further embodiment, the routing information is provided to the forwarding engines associated with the vPE cluster by using pre-defined generic routing encapsulation (GRE) tunnels (or any other applicable tunnels) that extend between the routing engine and a respective forwarding engine.

In accordance with still another embodiment, the GRE tunnels are adapted to enable carrying traffic to the routing engine and management traffic to the managing entity.

By yet another embodiment, the vPE cluster is provided with its own unified management, and the management is carried out by using a plurality of northbound (NB) interfaces for managing all virtual machines associated with that vPE cluster, and preferably also all traffic containers (such as docker containers).

According to another embodiment, the single routing engine resides in a single virtual machine together with a forwarding engine.

By yet another embodiment, the single routing engine resides in a plurality of virtual machines, together with a forwarding engine.

By still another embodiment, a plurality of routing engines resides in a single virtual machine together with a forwarding engine.

Another advantage that can be derived by using the above-described embodiments, is that a plurality of the same IP addresses may be used by different combinations of routing engine and forwarding engines, while the managing entity of the vPE cluster is configured to ensure that these addresses are not used in a way that would create collisions there-between. Consequently, different customers associated with the vPE cluster may be guaranteed that their traffic is conveyed separately from other customers that are also served by the very same vPE cluster.

In accordance with another embodiment, the sub-system provided further comprises a processor configured to generate docker type containers and/or a virtual machine that allow the vPE cluster to establish a plurality of microservices. Optionally, an identification of VTEP (Virtual Extensible LAN Tunnel Endpoint, is provided with the docker type containers, and/or by using virtual machines or any other applicable virtualization technology.

According to another aspect of the disclosure, there is provided an SDN communication system wherein all traffic to/from a plurality of mobile element, to/from a plurality of broadband communication elements and to/from enterprises, is forwarded via a single unified cloud, after it has been re-arranged based on pre-defined criteria.

In accordance with an embodiment of this aspect, the SDN communication system further comprising a processor (or any other applicable decision-making device) configured to add one or more indications to communication packets included in traffic flows being routed in the SDN communication system.

According to still another embodiment, the one or more indications are associated with at least one respective characteristic of the communication packets.

By yet another embodiment, the at least one respective characteristic of the communication packets is a member of a group that consists of: security level associated with traffic to which communication packets belong; customer service level agreement associated with traffic to which communication packets belong; service type (video, IOT, 5G, voice etc.) of traffic to which communication packets belong; and protocol type associated with traffic to which communication packets belong.

In accordance with a further embodiment, the SDN communication system further comprises a processor (or any other applicable decision-making device) configured to re-arrange traffic received, so that at least one of the traffic flows comprises only communication packets that meet one or more pre-defined criteria.

According to another aspect of the disclosure, there is provided a sub-system, operative to be used as a virtual Provider Edge (vPE) cluster of an SDN communication system and comprising a plurality of network elements and a managing entity (e.g. a processor or any other applicable decision making device), wherein the network elements each having one or more ports to enable conveying traffic therethrough, and wherein at least one of the ports associated with the sub-system is configured to serve a plurality of customers. As will be appreciated by those skilled in the art, a typical port is allocated to convey traffic only to one specific customer. However, by implementing the solution provided by the present disclosure, the managing entity is configured to enable sharing the resources associated with the at least one "shared" port and at the same time to ensure that a customer to whom a respective "shared" port had been allocated, will be provided with all guaranteed resources whenever required.

In accordance with another embodiment of this aspect, the vPE cluster further comprises one or more virtual routing engines for routing traffic to/from that plurality of network elements, the one or more virtual routing engines are configured to communicate with the managing entity and with a plurality of virtual forwarding engines, and wherein the managing entity is configured to manage operation of the one or more virtual routing engines and the plurality of virtual forwarding engines.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Figure 1:
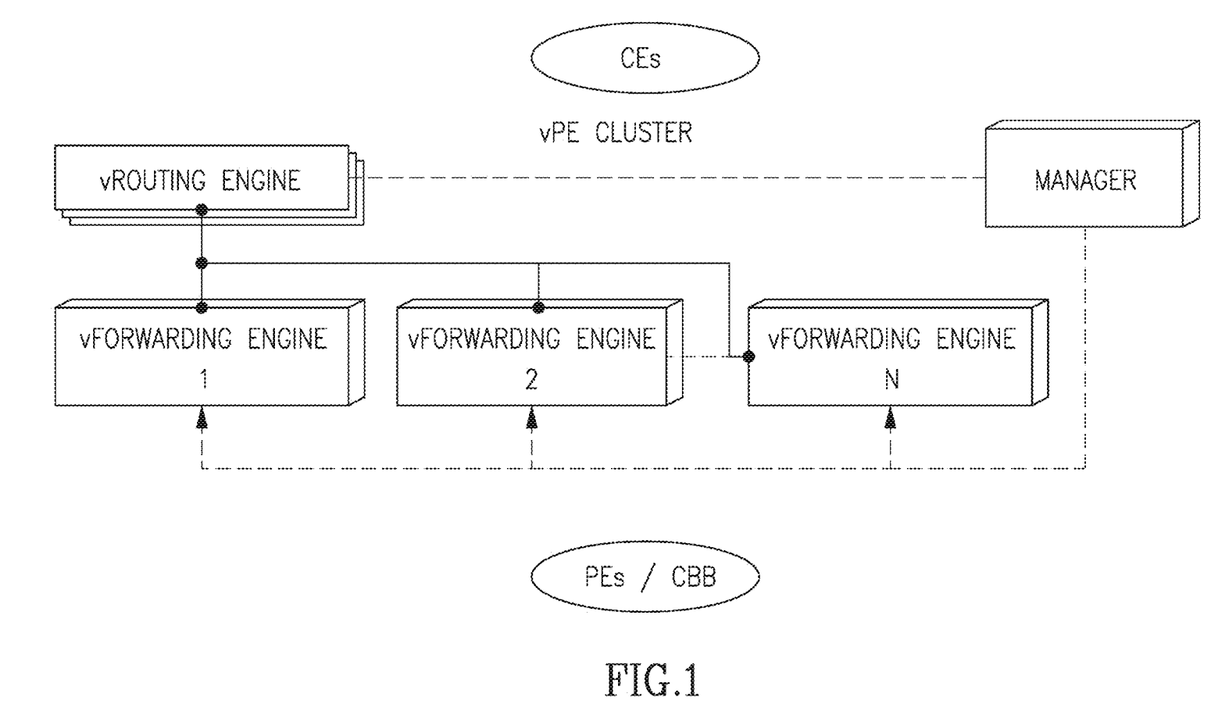
FIG. 1 illustrates a schematic view of a vPE cluster constructed in accordance with an embodiment of the present disclosure.

FIG. 1 illustrates a schematic view of a vPE cluster 100 that comprises one or more virtual routing engines 110 that is operative to communicate with a managing entity 120 on one hand and with a plurality of N virtual forwarding engines 130 on the other hand. Managing entity 120 is operative to manage the operation of both the virtual routing engines as well as the virtual forwarding engines, where the latter may be managed directly by managing entity 120 or indirectly, via their respective virtual routing engines.

Figure 2:
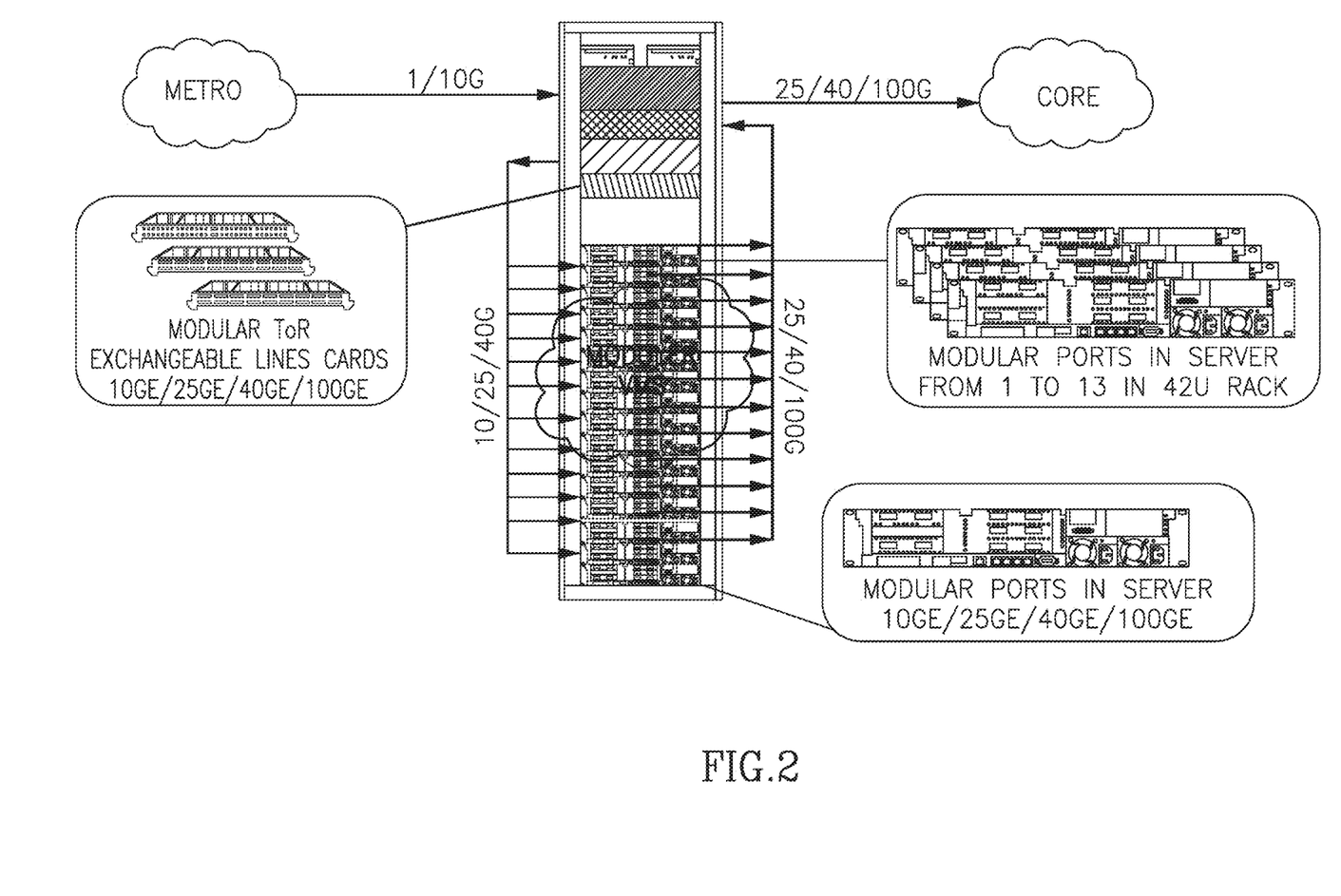
FIG. 2 demonstrates an optional rack connectivity.

FIG. 2 illustrates an embodiment of a rack connectivity. According to this embodiment, the vPE cluster is connected to a core network via a leaf-spine configuration, where the leaf and the spine in this case may both be composed of white boxes. In addition, the customer equipment (hereinafter "CE") may also be connected to the vPE cluster through white box ports. Furthermore, the connectivity for such a case may be arranged in a two-racks set up, in order to provide a requested redundancy for proper operation of the system.

Figure 3:
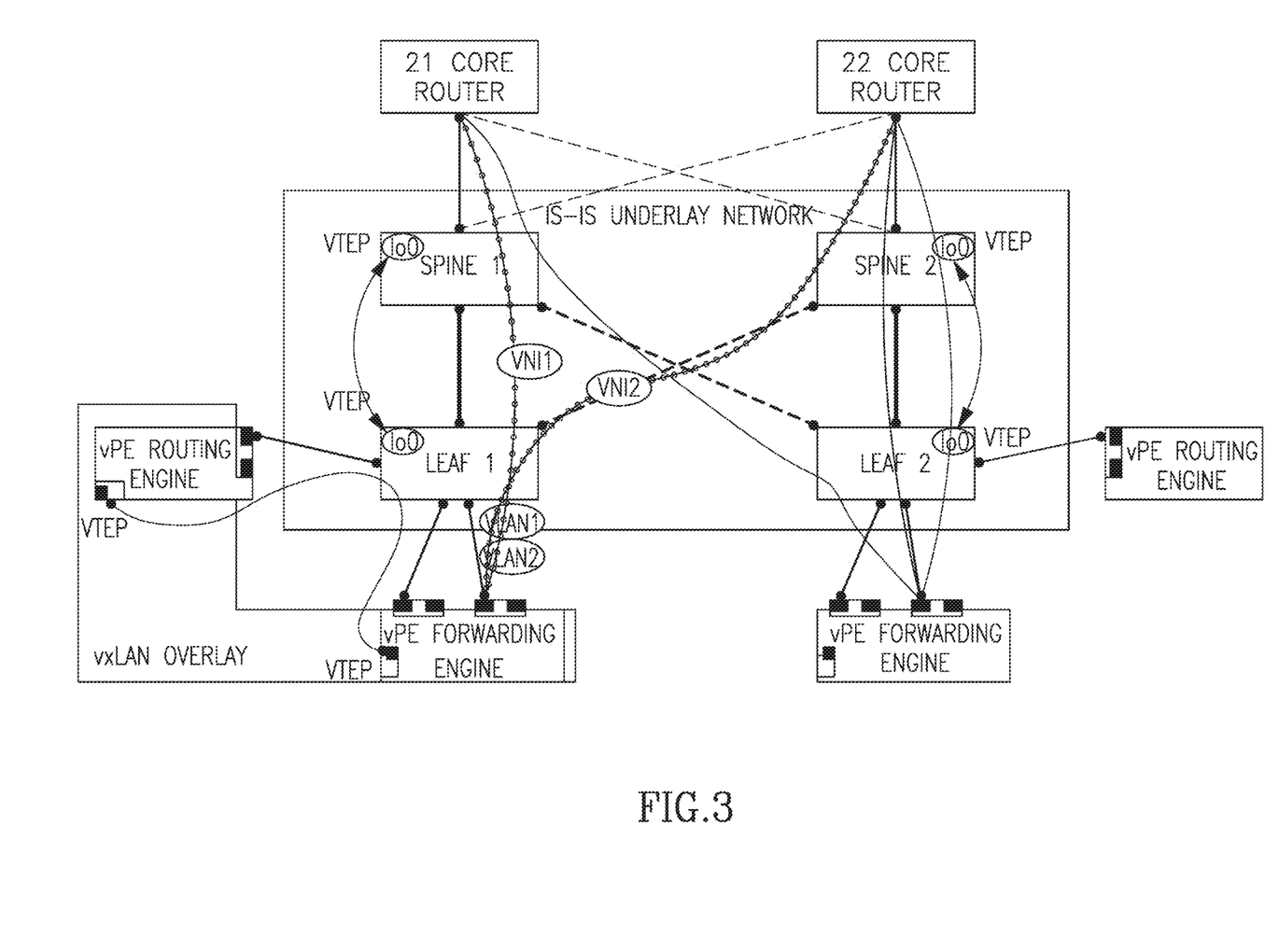
FIG. 3 exemplifies a network connectivity construed according to an embodiment of the present disclosure.

FIG. 3 illustrates an embodiment of a vPE network configuration, comprising two spines and two leaves, and the way the two spines are connected to two Carrier Routing Systems (CRS) and the leaves to respective vPE routing engines.

The following embodiments relate to the provisioning of unified routing service.

Figure 4:
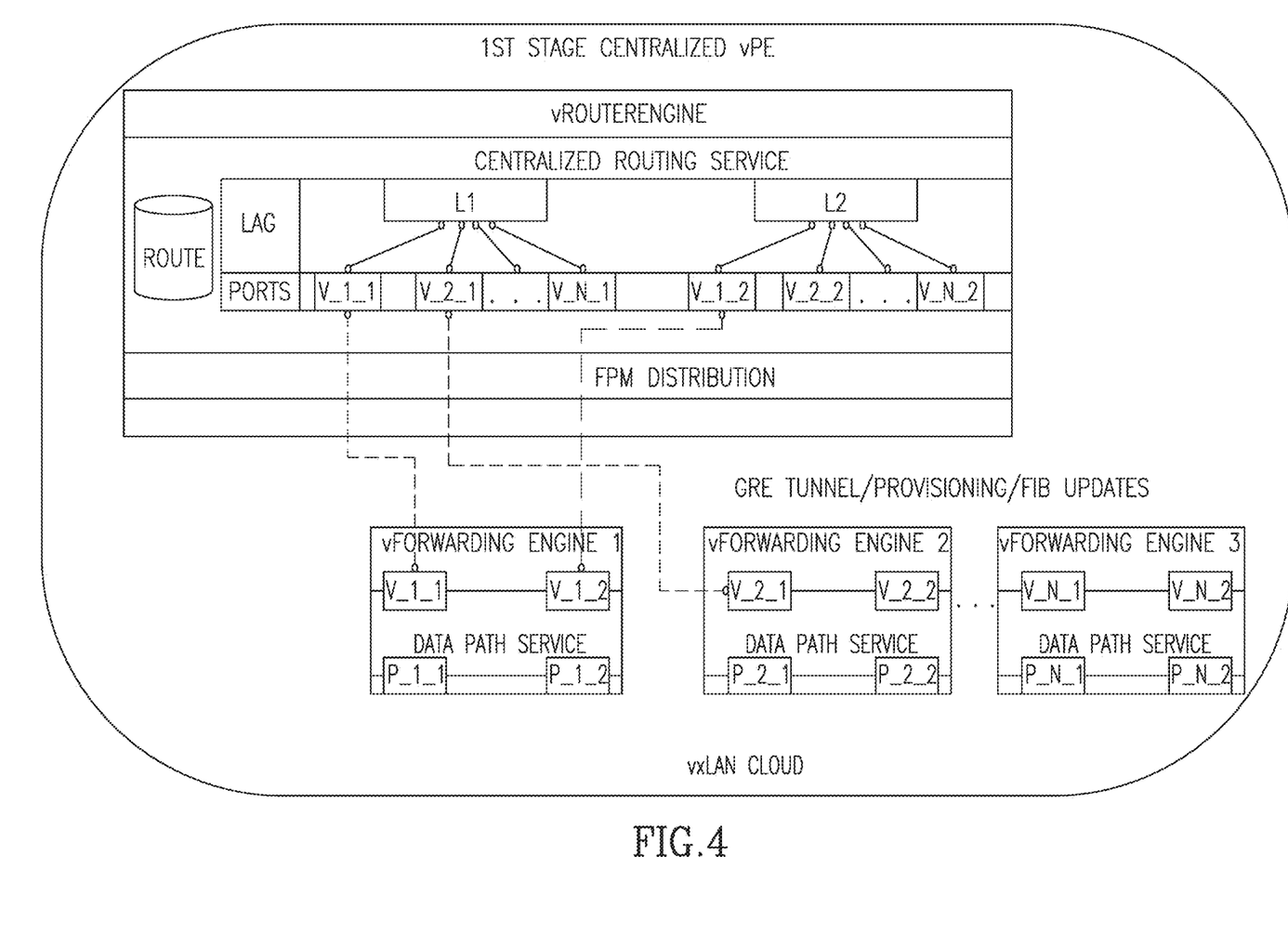
FIG. 4 demonstrates a centralized routing service configuration, where a vPE cluster comprises a single routing engine (RE).

FIG. 4 demonstrates a centralized routing service configuration, where the vPE cluster comprises a single routing engine (RE). The routing engine has a forwarding path manager (FPM) distribution functionality, in order to provide all forwarding engines (FEs) with all the routing information required for them to handle each specific routing case. The communication process in which forwarding and routing updates (e.g. after their retrieval from a forwarding information base (FIB) and/or from a routing information base) are provided by using generic routing encapsulation (GRE) tunnels, that extend between the RE and each FE. The management of the vPE cluster is carried out for each of the virtual machines (VM), by using multiple northbound (NB) interfaces and implementing protocols such as CLI, SNMP, and the like.

Next, let us take the following assumptions:
1) A specific FE will be used as the master forwarding engine in a respective data path service;
2) The routing service does not change the IP address (the next hop address) while the service is being provided;

3) No change should be affected after removal of the inner interface at the respective machine.

Figure 5:
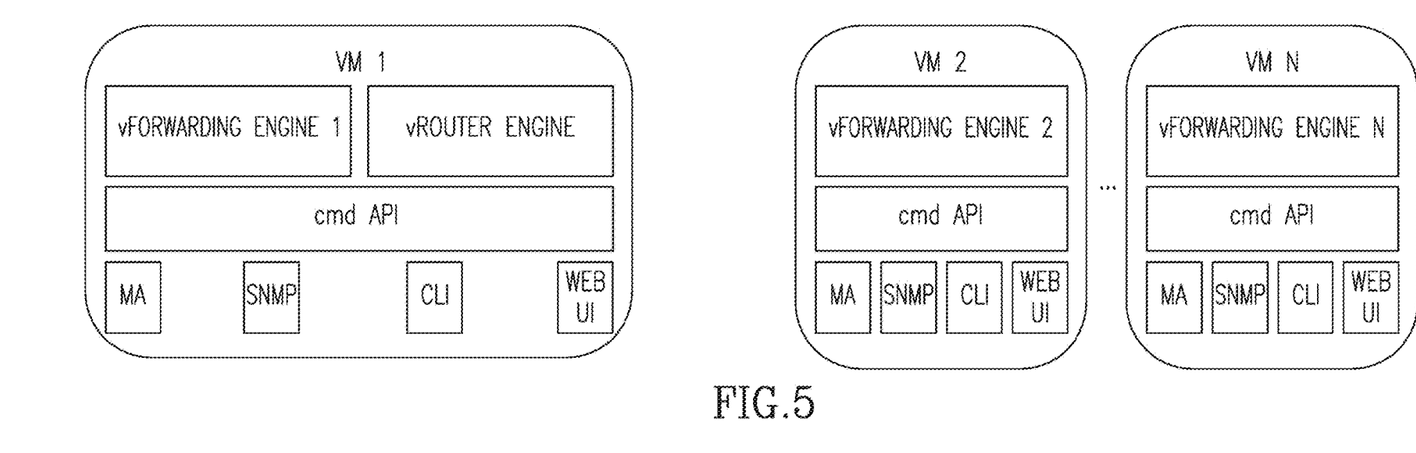
FIG. 5 illustrates an embodiment of a centralized routing service configuration where the routing engine resides with a master forwarding engine in a single virtual machine.
Figure 6:
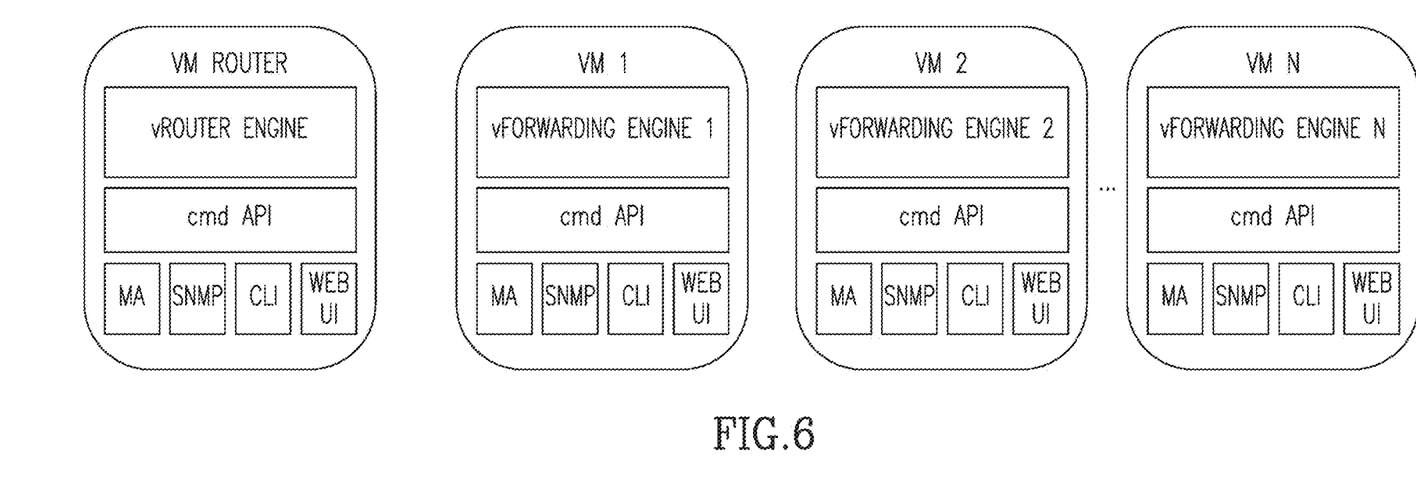
FIG. 6 illustrates another embodiment of a centralized routing service configuration where the single routing engine resides at a single virtual machine.

FIGS. 5 and 6 illustrate two embodiments construed in accordance with the present invention for a single routing engine residing with a forwarding engine. The first, where the routing engine resides with a master forwarding engine in a single virtual machine (FIG. 5) and wherein the other embodiment comprises a single routing engine residing at a single virtual machine. The latter option has the advantage that it provides an increased system availability.

Figure 7:
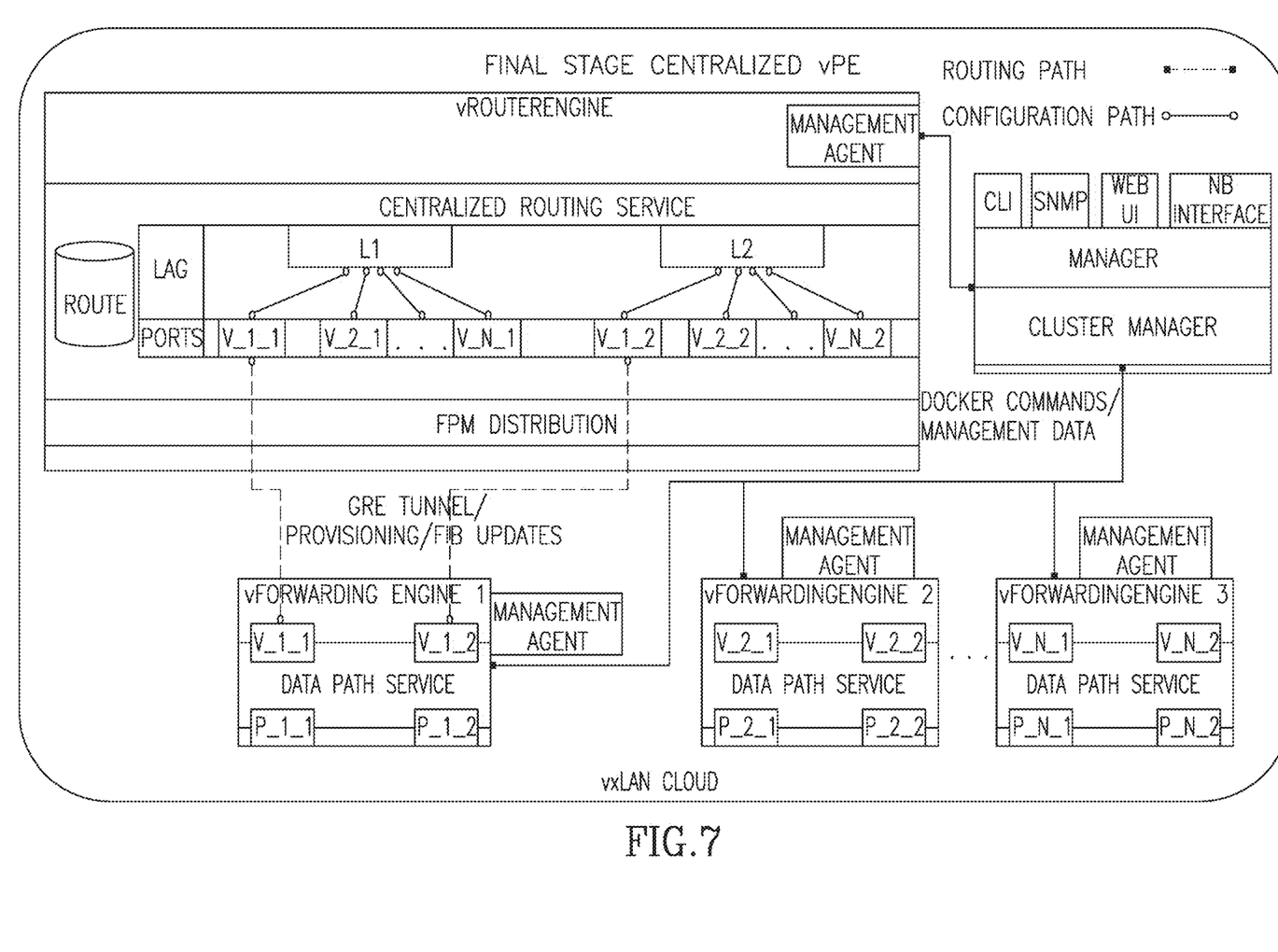
FIG. 7 presents a centralized vPE system construed in accordance with an embodiment of the present disclosure.
Figure 8:
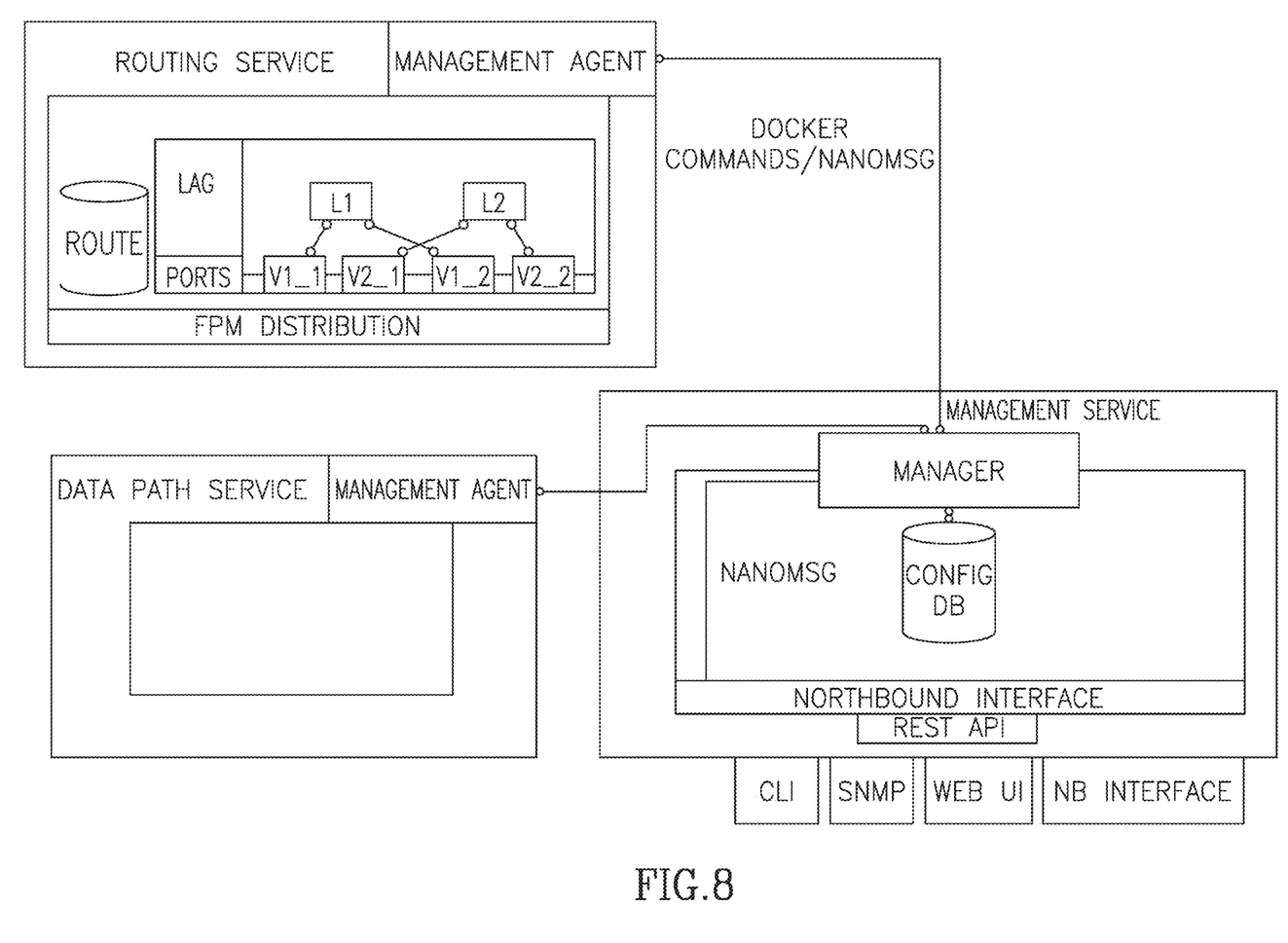
FIG. 8 presents a centralized vPE system construed in accordance with another embodiment of the present disclosure.

In accordance with another embodiment of the present disclosure, the vPE cluster has its own unified management service, in a way that the service has control over the whole vPE cluster. FIGS. 7 and 8 illustrate a centralized vPE system construed in accordance with this embodiment.

Optionally, all routing protocols may be handled by the centralized controller. For example, using eBGP for routing traffic towards the customer, iBGP for the route reflector, OSPF towards the core network and other PEs, and the like.

One way of carrying out a method for implementing this embodiment comprises the following phases:

First, a phase of starting the routing service (e.g. initializing the routing service and its virtual interfaces). Then, the next phase is starting the data path service. In this phase the following steps may preferably be taken:
  initializing virtual interfaces;
  initializing message handler
  Configuring GRE tunnels (asynchronic configuration)
  Setting forwarding path managers (FPM) (asynchronic setting)
  Configuring interfaces (e.g. providing IPs and MAC addresses).

A manager for the above-described embodiment may comprise different APIs for providing different services (e.g. data path services and routing services).

Figure 9:
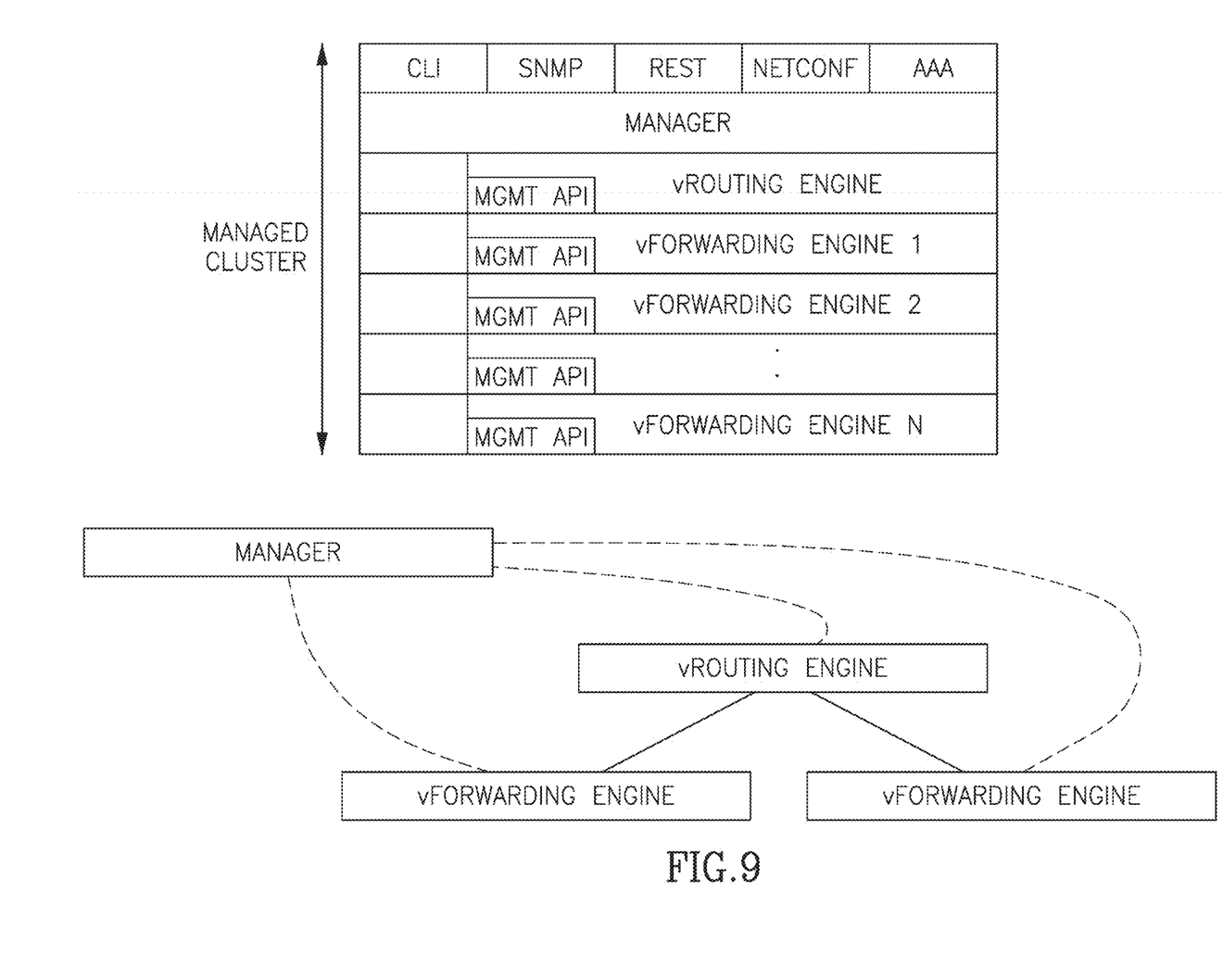
FIG. 9 illustrates an example of a vPE cluster and different functionalities associated therewith.

FIG. 9 exemplifies a vPE cluster and the different functions associated with such a cluster.

The services provided by the inner manager exemplified herein, are the following:
Registration Service
  register at TCP server
  Set up data path handler
Interface Manager (API)
  imposes configuration validation
  timeout considerations
Docker Keep Alive Service
Machine Keep Alive Service.

According to yet another embodiment of the disclosure, unified Northbound Interfaces are used for providing the management service. These interfaces may be compatible with: CLI, SNMP, AAA, Netconf, Syslog, Web UI RestConf and the like.

For the provisioning of the routing service, route processing is required. This processing may include path computations, routing table maintenance, and reachability propagation, as well as running all required routing protocols (OSPF, BGP, LDP, ISIS, RSVP) towards the CEs, PEs and core routers. In addition, the routing engine is used to update the FE of all its known FIBs and RIBs. Furthermore, the data path service may be used by the routing service to connect the cluster vPE to the outside world (e.g. to a different network).

The elasticity of the network described herein may further be improved by using one or more of the following options.

A. Using docker containers while operating the vPE. Such use has a number of advantages, among which are: use of docker containers allow the vPE to comprise a set (i.e. a plurality) of micro-services, and it enables running on a single VM, Multi-VM or Bare metal hosts, depending on the actual use requirements. The term "micro-service" as used herein is used to denote service having the same features/functionalities as the corresponding normal service, but being carried out at lower scale, e.g. having a lower capacity, and/or a lower number of routes and/or a lower number of customers, etc.

B. The VTEP (Virtual Extensible LAN Tunnel Endpoint) is in the docker containers and should function irrespective of the interface used, all without affecting any changes to the underlying interface. The Virtual Extensible LAN ("VXLAN") overlay should carry unicast messages for every communication exchanged between the containers (VTEP communication could use Multicast for certain L2 Broadcast messages like ARP requests).

C. Use of GRE tunnels that extend from forwarding engines which are generated on a per physical port basis, and adapted to carry:
  Route traffic to the routing engine; and
  Management traffic to the manager
D. Use of in-band management through lo-0 address.

In addition, it should be noted that each micro-pipeline is preferably responsible for a specific function (e.g., Tx, Rx, QoS, shaping, routing). The Tx and Rx pipelines may communicate with the network interface controller (NIC) using a Poll Mode Driver (PMD).

The solution described herein, enables forwarding of traffic to the next hop along the selected path in an extremely high speed bit processing rate. The packet forwarding tasks performed by the data path may further include: packet validation, packet lifetime control (TTL), and checksum calculation.

According to another aspect of the disclosure there is provided a solution for use in an SDN communication system, by which traffic which is conveyed in a unified cloud (e.g. metro cloud), is re-arranged based on pre-defined criteria. For example:
  Slicing traffic per security level required;
  Slicing traffic per customer SLA;
  Slicing traffic per service type (e.g. video, IOT, 5G, voice etc.)
  Slicing traffic per protocol/services (Video/TCP).

One way of implementing this solution is by having a processor which is adapted to add one or more indications to communication packets included in traffic flows being routed in the SDN communication system, so that when these communication packets are forwarded, the one or more indications will be used by the appropriate forwarding engines to have the communication packets forwarded in accordance with the pre-defined criterion associated with each respective indication.

This in turn improves the user experience as well as the network agility, and at the same time, managing one unified cloud reduces dramatically the expenses involved (capex and opex) as only one MetroCloud needs to be managed, instead of having to manage three separate metro networks (Mobility, Broadband and Enterprise), as is the case today.

In addition, transport and edge/core expenses may be reduced while implementing this solution by hairpinning the traffic in the metro network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An SDN communication system comprising a plurality of sub-systems, wherein each sub-system is operative as a virtual Provider Edge (vPE) cluster, characterized in that said virtual Provider Edge (vPE) cluster comprises a plurality of network elements and a single management entity, wherein said vPE cluster further comprises one or more virtual routing engines for routing traffic to/from said plurality of network elements, said one or more virtual routing engines are configured to communicate with said managing entity, and wherein said managing entity is configured to directly manage operation of the one or more virtual routing engines.

2. The SDN communication system of claim 1, wherein said vPE cluster is connected to a core network via a leaf-spine configuration.

3. The SDN communication system of claim 2, wherein said leaf and the spine configuration is an arrangement comprising a plurality of white boxes.

4. The SDN communication system of claim 3, wherein said plurality of white boxes comprises a plurality of commodity hardware, operating under a control of the managing entity acting as a centralized controller.

5. The SDN communication system of claim 1, wherein said network elements having each one or more ports to enable conveying traffic therethrough, and wherein at least one of the ports associated with said sub-system is configured to serve a plurality of customers.

6. The SDN communication system of claim 1, wherein said vPE cluster comprises a single routing engine (RE) having a forwarding path manager (FPM) distribution functionality, and is operative to provide forwarding engines (FEs) associated with said vPE cluster, with all routing information required for them to handle all traffic that needs to be forwarded therefrom.

7. The SDN communication system of claim 6, wherein said routing information is provided to said forwarding engines associated with said vPE cluster by using pre-defined generic routing encapsulation (GRE) tunnels that extend between said routing engine and a respective forwarding engine.

8. The SDN communication system of claim 7, wherein said GRE tunnels are adapted to enable carrying traffic to the routing engine and management traffic to the managing entity.

9. The SDN communication system of claim 6, wherein said vPE cluster is provided with its own unified management, and the management is carried out by using a plurality of northbound (NB) interfaces for managing all virtual machines associated with the vPE cluster.

10. The SDN communication system of claim 6, wherein said single routing engine resides in a single virtual machine together with a forwarding engine.

11. The SDN communication system of claim 6, wherein said single routing engine resides in a plurality of virtual machines together with a forwarding engine.

12. The SDN communication system of claim 6, wherein said vPE cluster comprises a plurality of routing engines, each having a forwarding path manager (FPM) distribution functionality, and wherein the plurality of routing engines resides in a single virtual machine together with a forwarding engine.

13. The SDN communication system of claim 1, comprises a processor configured to generate docker type containers that allow the vPE cluster to establish a plurality of micro-services.

14. The SDN communication system of claim 13, wherein an identification of VTEP (Virtual Extensible LAN Tunnel Endpoint) is provided with the docker type containers.

15. An SDN communication system of claim 1, wherein all traffic to/from a plurality of mobile element, to/from a plurality of broadband communication elements and to/from enterprises, is forwarded via a single unified cloud, after it has been re-arranged based on pre-defined criteria.

16. The SDN communication system of claim 15, further comprising a processor operative to add one or more indications to communication packets included in traffic flows being routed in the SDN communication system.

17. The SDN communication system of claim 16, wherein the one or more indications are associated with at least one respective characteristic of said communication packets.

18. The SDN communication system of claim 17, wherein the at least one respective characteristic of said communication packets is a member of a group that consists of: security level associated with traffic to which communication packets belong; customer service level agreement associated with traffic to which communication packets belong; service type of traffic to which communication packets belong; and protocol type associated with traffic to which communication packets belong.

19. The SDN communication system of claim 15, further comprises a processor configured to re-arrange traffic received, so that at least one of the traffic flows comprises only communication packets that meet one or more pre-defined criteria.

* * * * *